(12) United States Patent
Tamkin et al.

(10) Patent No.: US 8,336,045 B2
(45) Date of Patent: Dec. 18, 2012

(54) INTEGRATION OF AN EXTERNAL SOFTWARE APPLICATION(S) WITH A SCALE SOFTWARE APPLICATION

(75) Inventors: Ronald W. Tamkin, Pataskala, OH (US); Daniel J. Hackathorne, Milford Center, OH (US); Kevin A. Russo, Lewis Center, OH (US)

(73) Assignee: Mettler-Toledo, LLC, Columbus, OH (US)

( * ) Notice: Subject to any disclaimer, the term of this patent is extended or adjusted under 35 U.S.C. 154(b) by 1170 days.

(21) Appl. No.: 11/947,602

(22) Filed: Nov. 29, 2007

(65) Prior Publication Data
US 2009/0144717 A1 Jun. 4, 2009

(51) Int. Cl.
*G06F 9/445* (2006.01)
(52) U.S. Cl. ......... 717/175; 717/176; 717/177; 717/178
(58) Field of Classification Search .................. None
See application file for complete search history.

(56) References Cited

U.S. PATENT DOCUMENTS

| | | | | |
|---|---|---|---|---|
| 4,377,214 A * | 3/1983 | Hansen et al. | ............. | 177/25.15 |
| 4,928,229 A * | 5/1990 | Teraoka et al. | ............... | 705/414 |
| 6,246,967 B1 * | 6/2001 | Libicki et al. | ................. | 702/101 |
| 6,462,286 B1 | 10/2002 | Schwartz et al. | | |
| 6,884,946 B2 | 4/2005 | Miller et al. | | |
| 7,120,611 B1 * | 10/2006 | Vaghi | ............................. | 705/407 |
| 7,587,335 B2 * | 9/2009 | Schuller et al. | ................. | 705/23 |
| 7,612,302 B2 * | 11/2009 | Tamkin et al. | ............. | 177/25.15 |
| 7,620,520 B2 * | 11/2009 | Vock et al. | ..................... | 702/173 |
| 7,774,285 B2 * | 8/2010 | Hu et al. | ........................ | 705/407 |
| 8,009,614 B2 * | 8/2011 | Oguchi | ......................... | 370/328 |
| 2005/0149382 A1 * | 7/2005 | Fenner et al. | .................... | 705/10 |
| 2005/0194192 A1 | 9/2005 | Kriger | | |
| 2005/0247494 A1 * | 11/2005 | Montagnino | ................... | 177/60 |
| 2006/0004675 A1 * | 1/2006 | Bennett et al. | ................ | 705/402 |
| 2006/0036558 A1 * | 2/2006 | Mathews | ....................... | 705/414 |
| 2007/0222600 A1 * | 9/2007 | Reeves et al. | ............. | 340/572.4 |

FOREIGN PATENT DOCUMENTS

| | | |
|---|---|---|
| JP | 11-94636 A | 4/1999 |
| KR | 10-2006-0054814 A | 5/2006 |
| WO | 94/18621 A1 | 8/1994 |
| WO | 2005/059487 A1 | 6/2005 |

OTHER PUBLICATIONS

Avery Berkel, MP Series Introduction, Mar. 2007, 2 pages, Issue 5, Avery Weigh-Tronix, West Midlands, England.
Avery Berkel, MP Series Hardware Profile, Mar. 2007, 6 pages, Issue 5, Avery Weigh-Tronix, West Midlands, England.
Avery Berkel, MP Series Counter Service, Mar. 2007, 2 pages, Issue 5, Avery Weigh-Tronix, West Midlands, England.
Avery Berkel, MP Series Model Range, Mar. 2007, 6 pages, Issue 5, Avery Weigh-Tronix, West Midlands, England.

(Continued)

*Primary Examiner* — Isaac Tecklu
(74) *Attorney, Agent, or Firm* — Standley Law Group LLP

(57) ABSTRACT

A Scale Integration Framework that allows secondary applications installed on a PC-based scale or at a remote location to interact with a Scale Application that controls the scale equipment in accordance with applicable requirements. The scale integration framework comprises a plurality of Integration Points within the Scale Application such that other value added applications can interact with the Scale Application at these Integration Points.

24 Claims, 1 Drawing Sheet

OTHER PUBLICATIONS

Avery Berkel, PC Based, 2007, 1 page, Avery Weigh-Tronix, http://www.averyberkelusa.com/index.php?page=shop.browse&category_id=8&option=com_virtuemart&Itemid=1.

Digi, POS Terminal, 2002, 1 page, Teraoka Seiko Co., Ltd., http://www.digisystem.com/products/retail_pos.html.

Digi, Powered by Linux OS, the SM700 Scale offers unlimited possibilities., 2002, 1 page, Teraoka Seiko Co., Ltd., http://www.digisystem.com/products/retail_ssp_sm700.html.

Digi, Sleek, stylish & space saving, the new generation PC based counter scale printer projects an elegant touch to your store., 2002, 1 page, Teraoka Seiko Co., Ltd., http://www.digisystem.com/products/retail_ssp_sm800.html.

Elsevier Food International, Scaling up the s(c)ales potential, Feb. 2007, 4 pages, vol. 10, No. 1, Elsevier Food International, http://www.foodinternational.net/articles/instore/710/scaling-up-the-scales-potention.html.

* cited by examiner

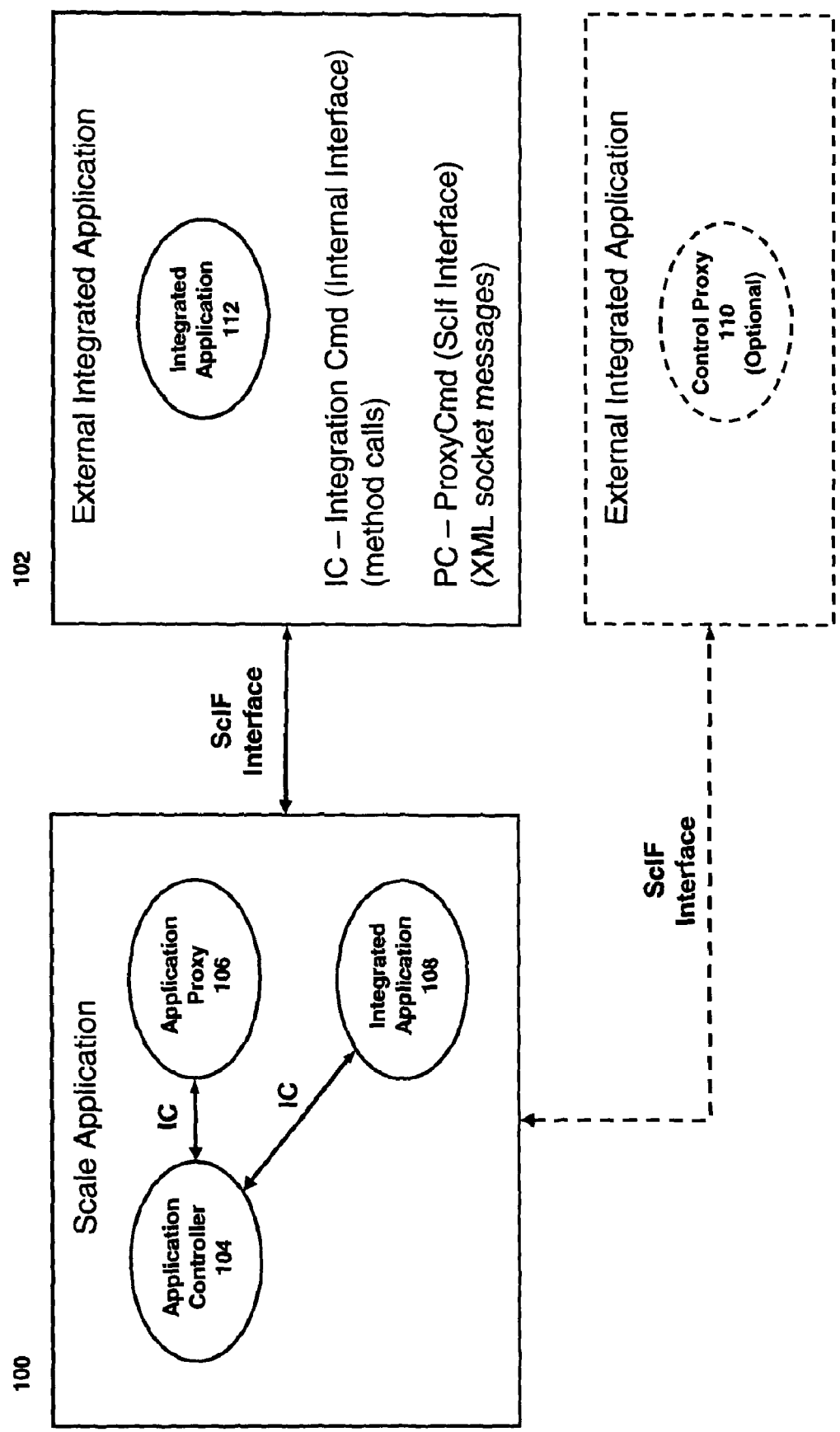

INTEGRATION OF AN EXTERNAL SOFTWARE APPLICATION(S) WITH A SCALE SOFTWARE APPLICATION

BACKGROUND OF THE INVENTIVE FIELD

The present invention is directed to PC-based scales and the software applications governing their operation. More particularly, the present invention is directed to a scale software application that permits external software applications to interact therewith.

Historically, scales have been designed and used only to determine the weights of various items. The development of PC-based scales has allowed scale companies to offer features and functionality beyond the ability to weigh items, especially in the area of retail scales. PC-based scales add value to the scale itself and when used in a retail environment, can support interaction not only with the store personnel but with customers as well. As a result, there is a desire to leverage the scale asset in new ways.

One way to increase the features and functionality of a PC-based scale is to run additional software applications on the scale hardware. In a weighing environment, particularly a legal for trade weighing environment, however, there are certain restrictions placed by governing bodies around access to the weighing equipment and its peripherals to prohibit the perpetration of fraud during weight transaction processing. For example, third party access to the load cell (weighing) functions of the scale is generally prohibited.

PC-based scales typically have a scale software application that governs their operation and remains in control of the equipment to ensure the applicable restrictions are not violated. If a secondary non-weighing application needs to interact with a legal for trade device, it must do so through the scale application. In another example, if a secondary application designed to offer information to the operator or the customer related to the item being processed needs to interact with the scale application, this application must also operate under the control of the scale application to know where it can display the information and what item is being processed. If weight information is required or there is a need to print a label, the secondary application must use the scale application to perform these functions as well.

Developing secondary applications for PC-based scales is challenging because of the various legal requirements that must be met when the scale is in operation. Thus, there is a need for a PC-based scale that allows secondary applications to operate without compromising the integrity of the weighing portion of the scale load cell and other peripherals used in weight transactions. What is needed is a PC-based scale software application framework that allows secondary applications to interact with a scale application while allowing the scale application to maintain control of the weighing equipment to ensure the applicable requirements are met.

SUMMARY OF THE GENERAL INVENTIVE CONCEPT

The present invention is a Scale Integration Framework that facilitates the interaction between secondary applications and a Scale Application that controls the associated scale equipment in accordance with applicable requirements. The Scale Integration Framework comprises a plurality of Integration Points within the Scale Application such that other value added applications can interact with the Scale Application through these Integration Points. By controlling the interaction between secondary applications and the Scale Application, the benefits of running such secondary applications on the associated scale can be attained while minimizing or eliminating the risk that such secondary applications will improperly interface with or otherwise effect protected scale functions.

In certain embodiments of the present invention, the secondary applications may reside on the PC-based scale itself. For example, secondary applications may reside on the same hard drive or other storage medium that contains the Scale Application. In other embodiments of the present invention, secondary applications may reside on a local or remote server, and may be interact with the Scale Application through an accessible network.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1 is a block diagram of a Scale Application with Integration Points according to an example embodiment of the present invention.

DETAILED DESCRIPTION OF EXEMPLARY EMBODIMENT(S)

The Scale Integration Framework (ScIF) of the present invention enables third-party secondary applications with non-scale functionality to integrate with a Scale Application that governs the operation of a PC-based scale. A ScIF interface is defined by the messages between an Integration Point within the Scale Application (SA) and a cooperating process. In an example embodiment of the present invention, communications are effected through XML messages on a socket interface. The cooperating process is called an Integrated Application (IA).

Integrated Applications provide additional features and functionality on the scale that are closely coordinated with basic functions of the scale. Generally they provide a visible display that supports user interactions. They are not part of the base Scale Application but are easily added and provisioned to cooperate therewith.

The Scale Application closely controls the state of the Integrated Application to ensure that applicable legal requirements are met. When provisioned, the Scale Application launches the Integrated Application process with the socket port number as an argument. The Integrated Application process connects to the given port without any display. When the connection is established, the Scale Application sends an "initialize" message to the Integrated Application. This message includes configuration data for the Integrated Application. No other messages are generally sent to the Integrated Application until it is activated by the Scale Application's Integration Point (IP).

The "activate" message may include name-value properties that define the context or other information about the state of the Integration Point. These properties may define, for example, the name of the video file to play, the PLU number and department number currently being transacted by the scale, or location information on the display for use by the application. The Integrated Application then displays to the customer. Either application may end this active state. For example, the Scale Application may send a "deactivate" message or the Integrated Application may send a "return" message. Other information may be transacted while the application is in the active state.

Each Integration Point is defined by a Scale Application developer. An Integration Point definition includes the set of messages that are used in the communications between the Scale Application and Integrated Application. These messages may be in the form of XML documents. In an example embodiment of the present invention, the Scale Application sends "initialize," "activate," "deactivate," "message," and "exit" messages. In an example embodiment of the present invention, the Integrated Application sends "request," "return," and "abort" messages. A "validation response" message is also sent to confirm the receipt of each of the above command messages.

An Application Controller provides for the initiation of the Integrated Applications and performs routing for messages between the Integration Point and the Integrated Application. The structure encourages a narrow definition for the ScIF interface. Integrated Applications may be configured to run within the Scale Application process or as an external process. As an external process, an Integrated Application may be written in any programming language that supports socket communications.

The ScIF provides considerable support for scale application developers. An Integrated Application super class is easily extended to define specified functionality. If the developer defines context and state information through the ScIF messages, the Integrated Application may easily be configured to run as a separate process. If Scale Application facilities are used, then those interfaces are supported only within the Scale Application process.

Integration Points are supported with an IPHandler super class. This class can be extended as an inner class within the class that the Integration Point is defined. The handler deals with all messaging with the Integrated Application through the Application Controller.

Referring to FIG. 1, a block diagram of a Scale Application with Integration Points according to the present invention is shown. The initialize command is the first message sent from the Scale Application 100. An Application Controller 104 provides for the initiation of the Integrated Applications and performs routing for messages between the Integration Point and the Integrated Applications 108, 112. As shown in FIG. 1, an integrated Application may be an external application 112 or may be embedded in the Scale Application 100.

In some cases, it may be difficult to coordinate the focus of two application windows. As such, one option is to have the Scale Application 110 populate the prescribed Integrated Application area with a blank white panel, set the Integrated Application window to be alwaysOnTop, and have the white panel provide a mouse listener that deactivates the Integrated Application in the event the application fails.

A ProxyApplication object 106 monitors the socket connection and the status of the process. Timely response messages are monitored for each sent command. When any variance is determined, the ProxyApplication 106 cleans up the application. An "exit" command is returned to the Integration Point whenever a command is received by the Application Controller 104 for the Integration Point.

A first example integration point according to the present invention is a PLU Edit Screen Integration Point. The scale application is provisioned with the integrated_applications.xml file (Appendix A). This file includes information for the general setup of the ScIF and configuration information for each of the Integrated Applications. When the Integration Point is reached in the Scale Application (Transition to PLU EDIT SCREEN) and a plu flag is set to a particular value (e.g., 2, 4, or 6), the Integration Point activates the Integrated Application. The Integrated Application is responsible for displaying, keeping focus (top window) and providing the operator with an option of printing and returning from the plu edit screen back to the main screen of the Scale Application. The Integrated Application sends the "print" message to the Integration Point and then a "return" message once the "Print Complete" message is received from the Integration Point. The Integrated Application processes "OverRideStarted" and "OverRideFinished" messages from the Integration Point to allow the operators to over ride data fields being displayed on the plu edit screen. "OverRideStarted" designates that the Integrated Application should "hide" or allow scale application to become the active window. "OverRideFinished" designates that the Integrated Application can become visible again.

The integrated_applications.xml file as shown in Appendix A enables the PLU edit screen Integration Point.

The ScIF creates the following command line to launch the Integrated Application's process.

TABLE

C:\Program Files\myApp\test.exe "-a" "-b" "name=Test Application" "port=3000"

The –a and –b arguments are configurable. The name and port arguments are added by the ScIF.

After the Integrated Application connects to the given socket port (on localhost), the ScIF sends the "initialize" command and receives an initialize confirmation (Appendix A). The "initialize" command includes the application's XML element from the XML configuration file.

When the Integration Point is reached in the Scale Application, the Integrated Application is displayed. The Integrated Application is sent a "deactivate" message when the Scale Application transitions back to main screen or when a "return" message is sent by the Integrated Application. The Integrated Application may send a "return" message to return to the Scale Application. Upon reception of the "deactivate" message or when a "return" message is initiated, the Integrated Application removes its display.

In an example embodiment of the present invention, the Integrated Application receives the following list of properties based on the type of PLU that is requested from the Scale Application or updated data that has been modified by the operator:

TABLE

| Property | Code |
| --- | --- |
| Description Line One: | <entry key="desc1"> |
| IP Screen Type: | <entry key="screentype">plu_edit</entry> |
| Count (Number of Item is a pack): | <entry key="count">1</entry> |
| Number of Labels (Number of Label to be printed): | <entry key="num_lbls">1</entry> |

TABLE-continued

| Property | Code |
| --- | --- |
| Department Number of the PLU: | <entry key="dept_no">0</entry> |
| NetWeight of the Standard Pack Item: | <entry key="netweight">0.0</entry> |
| Plu Flag(2, 4, or 6 denotes the integrated PLUs) NOTE: Plu data has this flag set for the Integration Point to activate the Integrated Application. | <entry key="plu_flag">4</entry> |
| Plu Type: (0 = By Weight, 1 = By Count, 3 = Standard Pack) | <entry key="plu_type">3</entry> |
| Plu Number: | <entry key="plu_no">172</entry> |
| Total Price: | <entry key="tprice">1.72</entry> |
| Total Weight of a By Weight Item: | <entry key="weight">0.00</entry> |

The Scale Application may request focus through the "OverRideStarted" message to allow the user to change some data on the plu edit screen. This action causes the Integration Point to send the updated information to the Integrated Application. Appendix B has example messages sent from the PLU Edit Screen Integration Point to update data.

Appendix C has an example of a set of transactions for the PLU Edit Screen, each preceded by a timestamp. The direction of the message is defined from the Scale Application's perspective. The first activation is concluded by the application with a "return" command. The second activation is concluded by the scale application.

The "activate" message contains the properties for the display's window in pixels. In this instance the origin of the window is x=0 and y=140. The size of the window is 460 pixels high by 800 pixels wide.

When the socket connection is broken or an "exit" message is sent, the Integrated Application terminates. The process is terminated by the Scale Application shortly after these events.

A second example integration point according to the present invention is the self-serve kiosk Integration Point. This scale application is provisioned with the integrated_applications.xml file (Appendix D). This file includes information for the general setup of the ScIF and configuration information for each of the Integrated Applications. The configuration shown in Appendix D enables the self-serve kiosk Integration Point, configures the Kiosk SELECTOR screen with selection Integration Points, and configures an Integrated Application named Test Application with the Integration Point named testApp. The weightInterruptable and weightDisplay properties are used to configure the selector for the test application.

The ScIF creates the following command line to launch the Integrated Application's process.

TABLE

C:\Program Files\myApp\test.exe "-a" "-b" "name=Test Application" "port=3000"

The −a and −b arguments are configurable. The name and port arguments are added by the ScIF.

After the Integrated Application connects to the given socket port (on localhost) the ScIF sends the "initialize" command and receives an initialize confirmation (Appendix D). The command includes the application's XML element from the XML configuration file.

When the Integration Point is reached in the application, the selector application is displayed. When selected the configured application is sent an "activate" command. The application is sent a "deactivate" message when weight is added to the platter. The application may send a "return" message to return to the selector application. Upon reception of the "deactivate" message or a "return" message is initiated, the integrated application removes its display.

Appendix E has an example set of transactions for a self-serve kiosk Integration Point, each preceded by a timestamp. The direction of the message is defined from the Scale Application's perspective. The first activation is concluded by the application with a "return" command. The second activation is concluded by the scale application.

The "activate" message shown in Appendix E contains the properties for the display's window in pixels. In this instance the origin of the window is x=0 and y=140. The size of the window is 460 pixels high by 800 pixels wide.

When the socket connection is broken or an "exit" message is sent, the integrated application terminates. The process is terminated by the Scale Application shortly after these events.

While certain embodiments of the present invention are described in detail above, the scope of the invention is not to be considered limited by such disclosure, and modifications are possible without departing from the spirit of the invention as evidenced by the following claims:

APPENDIX A

PLU Edit Screen Integrated Application XML and Messages

```
                integrated_application.xml
<?xml version="1.0" encoding="UTF-8"?>
<IntegratedApplications>
<properties>
      <entry key="initDelay">5</entry>
      <entry key="PluEditScreenApp">PluEditScreenApp</entry>
</properties>
   <application>
    <name>IntegrationPoint.PLU_EDIT_SCREEN</name>
    <integrationPoint>IntegrationPoint.PLU_EDIT_SCREEN
    </integrationPoint>
    <class>com.mt.genx.scifapps.PluEditScreenApp</class>
    <properties>
<entry key="screentype">plu_edit</entry>
    </properties>
   </application>
</IntegratedApplications>
                Initialize Command
<?xml version="1.0" encoding="UTF-8"?>
<methodCall>
  <methodName>init</methodName>
  <application>
   <name>PLU Edit Screen</name>
   <integrationPoint>IntegrationPoint.PLU_EDIT_SCREEN
   </integrationPoint>
   <class>com.mt.genx.scifapps.TestApp</class>
   <proxy>com.mt.genx.scif.ApplicationProxy</proxy>
   <process>
    <name>javaw.exe</name>
```

APPENDIX A-continued

PLU Edit Screen Integrated Application XML and Messages

```
      <path>C:\Program Files\Mettler Toledo\Service\jre\bin</path>
      <workDir>C:\Program Files\Mettler Toledo\Service</workDir>
      <arg>com.mt.genx.scif.ControllerProxy</arg>
    </process>
    <properties>
      <entry key="timeout">15</entry>
      <entry key="x">0</entry>
      <entry key="y">310</entry>
      <entry key="width">800</entry>
      <entry key="height">290</entry>
    </properties>
  </application>
</methodCall>
                Initialize Confirmation
<?xml version="1.0" encoding="UTF-8"?>
<methodResponse>OK</methodResponse>
```

APPENDIX B

Example Messages from Integration Point to Update Data

Price change occurred, Total Price is sent
Tue Aug 14 07:14:20 EDT 2007 SEND timeout=5
```
<?xml version="1.0" encoding="UTF-8"?>
<methodCall>
  <methodName>message</methodName>
  <properties>
    <entry key="tprice">3.18</entry>
  </properties>
  <integrationPoint>IntegrationPoint.PLU_EDIT_SCREEN
  </integrationPoint>
</methodCall>
```
Contents/Qty change occurred, for a Standard Pack Item, NetWeight and Count messages sent:
Tue Aug 14 07:18:15 EDT 2007 SEND timeout=5
```
<?xml version="1.0" encoding="UTF-8"?>
<methodCall>
  <methodName>message</methodName>
  <properties>
    <entry key="netweight">125.0</entry>
  </properties>
  <integrationPoint>IntegrationPoint.PLU_EDIT_SCREEN
  </integrationPoint>
</methodCall>
Tue Aug 14 07:18:15 EDT 2007 SEND timeout=5
<?xml version="1.0" encoding="UTF-8"?>
<methodCall>
  <methodName>message</methodName>
  <properties>
    <entry key="count">5</entry>
  </properties>
  <integrationPoint>IntegrationPoint.PLU_EDIT_SCREEN
  </integrationPoint>
</methodCall>
Tue Aug 14 07:18:15 EDT 2007 RECEIVE
<?xml version="1.0" encoding="UTF-8"?>
<methodResponse>OK</methodResponse>
Tue Aug 14 07:18:15 EDT 2007 RECEIVE
<?xml version="1.0" encoding="UTF-8"?>
<methodResponse>OK</methodResponse>
```

APPENDIX C

Example Transactions for PLU Edit Screen

Activate Command send from Integration Point:
Tue Aug 14 06:38:43 EDT 2007 SEND timeout=5
```
<?xml version="1.0" encoding="UTF-8"?>
<methodCall>
  <methodName>activate</methodName>
  <properties>
    <entry key="tprice">0.29</entry>
    <entry key="desc1">,BAGUETTE</entry>
```

APPENDIX C-continued

Example Transactions for PLU Edit Screen

```
    <entry key="screentype">plu_edit</entry>
    <entry key="count">2</entry>
    <entry key="num_lbls">1</entry>
    <entry key="dept_no">0</entry>
    <entry key="plu_flag">2</entry>
    <entry key="plu_type">1</entry>
    <entry key="plu_no">171</entry>
  </properties>
  <integrationPoint>IntegrationPoint.PLU_EDIT_SCREEN
  </integrationPoint>
</methodCall>
Tue Aug 14 06:38:43 EDT 2007 RECEIVE
<?xml version="1.0" encoding="UTF-8"?>
<methodResponse>OK</methodResponse>
```
Print Request sent from Integrated Application:
Tue Aug 14 06:40:43 EDT 2007 RECEIVE
```
<?xml version="1.0" encoding="UTF-8"?>
<methodCall>
  <methodName>request</methodName>
    <properties>
      <entry key="Print">Print</entry>
  </properties>
    <integrationPoint>IntegrationPoint.PLU_EDIT_SCREEN
    </integrationPoint>
  </methodCall>
Tue Aug 14 06:40:43 EDT 2007 SEND
<?xml version="1.0" encoding="UTF-8"?>
<methodResponse>OK</methodResponse>
Tue Aug 14 06:40:45 EDT 2007 SEND timeout=5
<?xml version="1.0" encoding="UTF-8"?>
<methodCall>
  <methodName>message</methodName>
  <properties>
    <entry key="printComplete">printComplete</entry>
  </properties>
  <integrationPoint>IntegrationPoint.PLU_EDIT_SCREEN
  </integrationPoint>
</methodCall>
Tue Aug 14 06:40:45 EDT 2007 RECEIVE
<?xml version="1.0" encoding="UTF-8"?>
<methodResponse>OK</methodResponse>
```
Total Price message sent from Integration Point:
Tue Aug 14 06:40:43 EDT 2007 SEND timeout=5
```
<?xml version="1.0" encoding="UTF-8"?>
<methodCall>
  <methodName>message</methodName>
  <properties>
    <entry key="tprice">0.29</entry>
  </properties>
  <integrationPoint>IntegrationPoint.PLU_EDIT_SCREEN
  </integrationPoint>
</methodCall>
Tue Aug 14 06:40:43 EDT 2007 RECEIVE
<?xml version="1.0" encoding="UTF-8"?>
<methodResponse>OK</methodResponse>
```
Print Complete sent from Integration Point:
Tue Aug 14 06:40:45 EDT 2007 SEND timeout=5
```
<?xml version="1.0" encoding="UTF-8"?>
<methodCall>
  <methodName>message</methodName>
  <properties>
    <entry key="printComplete">printComplete</entry>
  </properties>
  <integrationPoint>IntegrationPoint.PLU_EDIT_SCREEN
  </integrationPoint>
</methodCall>
Tue Aug 14 06:40:45 EDT 2007 RECEIVE
<?xml version="1.0" encoding="UTF-8"?>
<methodResponse>OK</methodResponse>
```
Deactivate Command sent from Integration Point:
Tue Aug 14 06:48:48 EDT 2007 SEND timeout=5
```
<?xml version="1.0" encoding="UTF-8"?>
<methodCall>
  <methodName>deactivate</methodName>
  <integrationPoint>IntegrationPoint.PLU_EDIT_SCREEN
  </integrationPoint>
</methodCall>
```

APPENDIX C-continued

Example Transactions for PLU Edit Screen

Tue Aug 14 06:48:48 EDT 2007 RECEIVE
<?xml version="1.0" encoding="UTF-8"?>
<methodResponse>OK</methodResponse>
OverRideModeStarted Command sent from Integration Point:
This is a focus request from Integration Point. The Integrated Application hides its window until the OverRideModeFinished message is sent.
Tue Aug 14 06:57:42 EDT 2007 SEND timeout=5
<?xml version="1.0" encoding="UTF-8"?>
<methodCall>
  <methodName>message</methodName>
  <properties>
    <entry key="OverRideModeStarted">OverRideModeStarted</entry>
  </properties>
  <integrationPoint>IntegrationPoint.PLU_EDIT_SCREEN
  </integrationPoint>
</methodCall>
Tue Aug 14 06:57:42 EDT 2007 RECEIVE
<?xml version="1.0" encoding="UTF-8"?>
<methodResponse>OK</methodResponse>
OverRideModeFinished Command sent from Integration Point:
This is a focus request from Integration Point. The Integrated Application becomes visible again.
Tue Aug 14 06:57:53 EDT 2007 SEND timeout=5
<?xml version="1.0" encoding="UTF-8"?>
<methodCall>
  <methodName>message</methodName>
  <properties>
    <entry key="OverRideModeFinished">OverRideModeFinished</entry>
  </properties>
  <integrationPoint>IntegrationPoint.PLU_EDIT_SCREEN
  </integrationPoint>
</methodCall>
Tue Aug 14 06:57:53 EDT 2007 RECEIVE
<?xml version="1.0" encoding="UTF-8"?>
<methodResponse>OK</methodResponse>

APPENDIX D

Self-Serve Kiosk Integrated Application XML and Messages integrated_application.xml
<?xml version="1.0" encoding="UTF-8"?>
<IntegratedApplications>
  <properties>
    <entry key="initDelay">15</entry>
      <entry key="SelfServeMainScreenKiosk">SELECTOR</entry>
      <entry key="SelfServeKioskTimeout">5</entry>
  </properties>
  <application>
    <name>Test Application</name>
    <integrationPoint>testApp</integrationPoint>
      <proxy>com.mt.genx.scif.ApplicationProxy</proxy>
      <process>
          <name>test.exe</name>
          <path>C:\Program Files\myApp</path>
          <workDir>C:\Program Files\myApp</workDir>
          <arg>-a</arg>
          <arg>-b</arg>
      </process>
      <properties>
      </properties>
  </application>
  <application>
    <name>Kiosk Selector</name>
    <integrationPoint>SELECTOR</integrationPoint>
    <class>com.mt.genx.scifapps.SelectorApp</class>
    <properties>
      <entry key="x">0</entry>
        <entry key="y">0</entry>
        <entry key="width">800</entry>
      <entry key="height">600</entry>
      <entry key="rows">1</entry>
      <entry key="columns">2</entry>
    </properties>
      <selections>

APPENDIX D-continued

Self-Serve Kiosk Integrated Application XML and Messages

<selection>
            <weighButton>a</weighButton>
            <image>satellitegraphics/pic1.jpg</image>
        </selection>
        <selection>
            <ip>testApp</ip>
            <image>satellitegraphics/pic2.jpg</image>
        </selection>
    </selections>
  </application>
</IntegratedApplications>
                         Initialize Command
<?xml version="1.0" encoding="UTF-8"?>
<methodCall>
  <methodName>init</methodName>
  <application>
    <name>Test Application</name>
    <integrationPoint>testApp</integrationPoint>
      <proxy>com.mt.genx.scif.ApplicationProxy</proxy>
      <process>
          <name>test.exe</name>
          <path>C:\Program Files\myApp</path>
          <workDir>C:\Program Files\myApp</workDir>
          <arg>-a</arg>
          <arg>-b</arg>
      </process>
    <properties>
    </properties>
  </application>
</methodCall>
                       Initialize Confirmation
<?xml version="1.0" encoding="UTF-8"?>
<methodResponse>OK</methodResponse>

APPENDIX E

Self-Serve Kiosk Integration Point Transactions

Tue Aug 07 10:51:41 EDT 2007 SEND timeout=5
<?xml version="1.0" encoding="UTF-8"?>
<methodCall>
  <methodName>activate</methodName>
  <properties>
    <entry key="x">0</entry>
    <entry key="height">460</entry>
    <entry key="width">800</entry>
    <entry key="y">140</entry>
  </properties>
</methodCall>
Tue Aug 07 10:51:41 EDT 2007 RECEIVE
<?xml version="1.0" encoding="UTF-8"?>
<methodResponse>OK</methodResponse>
Tue Aug 07 10:51:46 EDT 2007 RECEIVE
<?xml version="1.0" encoding="UTF-8"?>
<methodCall>
  <methodName>return</methodName>
</methodCall>
Tue Aug 07 10:51:46 EDT 2007 SEND
<?xml version="1.0" encoding="UTF-8"?>
<methodResponse>OK</methodResponse>
Tue Aug 07 10:51:50 EDT 2007 SEND timeout=5
<?xml version="1.0" encoding="UTF-8"?>
<methodCall>
  <methodName>activate</methodName>
  <properties>
    <entry key="x">0</entry>
    <entry key="height">460</entry>
    <entry key="width">800</entry>
    <entry key="y">140</entry>
  </properties>
</methodCall>

APPENDIX E-continued

Self-Serve Kiosk Integration Point Transactions

```
Tue Aug 07 10:51:50 EDT 2007 RECEIVE
<?xml version="1.0" encoding="UTF-8"?>
<methodResponse>OK</methodResponse>
Tue Aug 07 10:51:51 EDT 2007 SEND timeout=5
<?xml version="1.0" encoding="UTF-8"?>
<methodCall>
  <methodName>deactivate</methodName>
</methodCall>
Tue Aug 07 10:51:51 EDT 2007 RECEIVE
<?xml version="1.0" encoding="UTF-8"?>
<methodResponse>OK</methodResponse>
```

What is claimed is:

1. A method for executing software applications on a PC-based scale comprising:
   (a) executing a scale application on a PC-based scale for controlling exclusive access to weighing functionality and peripherals of a PC-based scale;
   (b) defining in said scale application functionality for exchanging messages through a software port, said messages exchanged with at least one other software application executing on said PC-based scale;
   (c) installing a secondary software application for exchanging messages with said scale application through said software port according to said functionality in said scale application for exchanging messages;
   (d) launching said secondary software application with an identifier for said software port to cause said secondary software application to connect to said scale application through said identified software port; and
   (e) activating said secondary software application with activation properties from said scale application, said secondary software application activated by said scale application by sending an activation message to said secondary software application through said identified software port; and
   (f) deactivating said secondary software application with a deactivation message exchanged between said scale application and said secondary application through said identified software port.

2. The method of claim 1 wherein deactivating said secondary software application comprises sending a return message from said secondary software application to said scale application.

3. The method of claim 1 wherein deactivating said secondary software application comprises sending a deactivate message from said scale application to said secondary software application through said identified software port.

4. The method of claim 1 further comprising displaying said secondary software application to a user, said secondary software application displayed according to display parameters provided to said secondary software application by said scale application.

5. The method of claim 4 wherein displaying said secondary software application to a user comprises displaying multimedia content to said user.

6. The method of claim 4 wherein displaying said secondary software application to a user comprises displaying information related to a PLU number.

7. The method of claim 4 wherein displaying said secondary software application to a user comprises displaying information unrelated to a PLU number.

8. The method of claim 1 wherein activating said secondary software application results in a non-graphical exchange of data between said secondary software application and said scale application.

9. The method of claim 8 wherein said data is related to transactions that have occurred on said PC-based scale.

10. The method of claim 8 wherein said data is customer survey data.

11. The method of claim 8 wherein said data is related to the movement/relocation of goods.

12. The method of claim 1 wherein said secondary software application is installed on a remote PC in communication with said PC-based scale.

13. The method of claim 1 wherein said secondary software application is installed on a network server accessible by said PC-based scale.

14. A method for executing software applications on a PC-based scale comprising:
   (a) executing a scale application on a PC-based scale for controlling exclusive access to weighing functionality and peripherals of a PC-based scale;
   (b) defining in said scale application functionality for exchanging messages through one of a plurality of software ports, said messages exchanged with at least one other software application executing on said PC-based scale;
   (c) installing on said PC-based scale a secondary software application for exchanging messages with said scale application through one of said software ports according to said functionality in said scale application for exchanging messages;
   (d) launching said secondary software application with an identifier for one of said plurality of software ports, said secondary software application launched by said scale application to cause said secondary software application to connect to said scale application through said identified software port; and
   (e) activating said secondary software application with activation properties from said scale application, said secondary software application activated by said scale application by sending an activation message comprising activation properties to said secondary software application through said identified software port; and
   (f) deactivating said secondary software application with a deactivation message exchanged between said scale application and said secondary application through said identified software port.

15. The method of claim 14 wherein deactivating said secondary software application comprises sending a return message from said secondary software application to said scale application.

16. The method of claim 14 wherein deactivating said secondary software application comprises sending a deactivate message from said scale application to said secondary software application through said identified software port.

17. The method of claim 14 further comprising displaying said secondary software application to a user, said secondary software application displayed according to display parameters provided to said secondary software application by said scale application.

18. The method of claim 17 wherein displaying said secondary software application to a user comprises displaying multimedia content to said user.

19. The method of claim 17 wherein displaying said secondary software application to a user comprises displaying information related to a PLU number.

20. The method of claim 17 wherein displaying said secondary software application to a user comprises displaying information unrelated to a PLU number.

21. The method of claim 14 wherein activating said secondary software application results in a non-graphical exchange of data between said secondary software application and said scale application.

22. The method of claim 21 wherein said data is related to transactions that have occurred on said PC-based scale.

23. The method of claim 21 wherein said data is customer survey data.

24. The method of claim 21 wherein said data is related to the movement/relocation of goods.

* * * * *